Feb. 4, 1969 F. FULLER 3,425,453
OCEAN PIPELINE SYSTEM
Filed Oct. 21, 1965
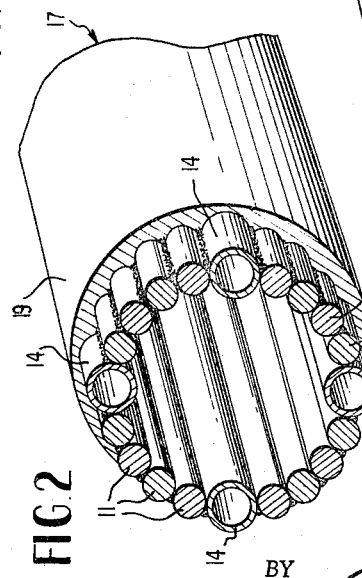
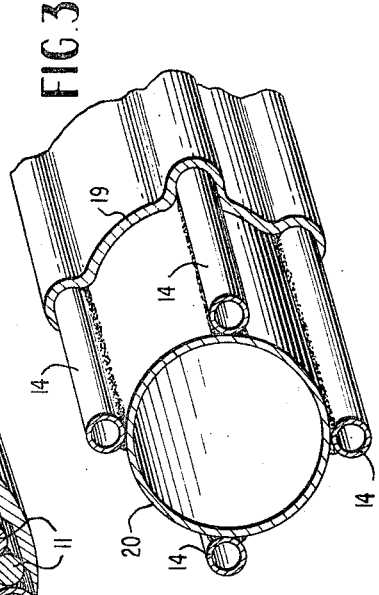
INVENTOR
FORNEY FULLER
BY
ATTORNEY United States Patent Office 3,425,453
Patented Feb. 4, 1969

3,425,453
OCEAN PIPELINE SYSTEM
Forney Fuller, 6950 Canal Blvd.,
New Orleans, La. 70124
Filed Oct. 21, 1965, Ser. No. 499,535
U.S. Cl. 138—111                    7 Claims
Int. Cl. B63b 13/00, 27/24; F16l 9/14

ABSTRACT OF THE DISCLOSURE

A multiconduit pipeline for underwater material delivery, the pipeline being coated with an anticorrosive material and weighing less per unit of cross-section than water when empty, a pair of pigs, defining a chamber between them, movably disposed in one of the conduits, a fluid disposed in the chamber, the specific gravity of the fluid varying the buoyancy of the pipeline.

---

This invention relates to a multiconduit pipeline for underwater multiple material delivery, a method of making a multiconduit pipeline, a method of laying such a pipeline and a method of raising and lowering a multiconduit pipeline for inspection and repair. It particularly relates to an underwater pipeline system employing a plurality of conduits, the specific weight of which is varied from less than that of water to greater than that of water to control its position in the water.

Over the years, a number of offshore pipelines have been installed but these have been generally limited to depths not exceeding 150 feet. The technology of offshore pipeline, to date, has been based on a conventional system of laying pipe in sections weighted with concrete sleeves to prevent floatation. A recent innovation in laying offshore pipeline has been to coil 4" and 6" pipe on large reels, transporting the reels to the pipeline site and unreeling the pipe into the water was a pipeline. This has proven to be uneconomical since economical material delivery requires a 30" to 48" diameter pipe. The laying of a pipeline of an economical size when weighted with concrete is a major engineering and construction problem which, because of its prohibitive cost, has proven uneconomical in water depths exceeding 150 feet.

In order to solve this problem, I have invented a pipeline formed from a plurality of steel rods and pipes, the buoyancy of which can be controlled at the will of an operator.

Briefly stated, my invention involves the use of a main barge having a welding jig to be used to form the pipeline. Steel rods and/or pipes would be uncoiled from large reels on adjacent barges and fed through the welding jig where they are then welded into a continuous multiple conduit pipeline. After the pipeline is welded, it is coated with an anticorrosive asphalt material and discharged from the rear of the main barge into the water. The weight of the pipeline is such that with the conduits empty the pipeline floats. As the fabrication progresses, the conduits are flooded with a fluid or liquid that allows the pipeline to be submerged at the point where the flooding liquid is introduced, and as additional pipeline is fabricated, the conduits continue to be flooded to the point where the weight of the line on the barge is made minimal. Some of the conduits are used for transporting the coating material, such as asphalt, and the welding gases from a shore station to the main barge and, in this manner, provide a continuous supply for the fabrication of the pipeline.

For an understanding of the invention's principles, reference is made to the following description of typical embodiments thereof as illustrated in the accompanying drawings. In the drawings:

FIG. 1 shows schematically a pipeline according to the invention wherein a portion is in its raised position;

FIG. 2 is a fragmentary end face perspective of one form of the conduit of the present invention;

FIG. 3 is a fragmentary end face perspective illustrating a different embodiment of the present invention; and FIG. 4 shows a partly sectioned, fragmentary side view of the method of raising a section of the pipeline.

As shown in FIG. 1, an auxiliary barge 10 feeds steel rods 11 to a welding jig 12 on main barge 13. Main barge 13 carries conduits 14 (not shown) which are fed into the welding jig in conjunction with the rods. The welded assembly 15 passes from the welding jig to a coating operation 16 which coats the assembly with an anticorrosive asphalt material and the final coated pipeline 17 enters the water at the rear of the main barge. Conduits 14, which start at shore and are carried by barge 13 during construction, can be used to supply the main barge with acetylene gas, oxygen, fresh water, asphalt and other materials necessary for the construction of the pipeline 17. The pipeline 17 can be given a selective buoyancy as indicated at 18 in a manner hereinafter described.

Pipeline 17 as shown in FIG. 2 is made of a plurality of steel rods 11 longitudinally welded to each other to form a tube-like structure, the rods being separated in at least one place by a conduit 14 which is longitudinally welded to adjacent steel rods to form an auxiliary passageway in the wall of the tube. The multiconduit pipeline is then coated with an asphalt material 19 for corrosion resistance.

FIG. 3 shows a modified type of multiconduit pipeline which is formed from a large standard pipe 20 having conduits 14 welded longitudinally to its exterior walls in a manner hereinbefore described.

The weight per unit of cross-section of the multiconduit pipelines as shown in FIGS. 2 and 3 is such that the pipelines float when the conduits are empty, but submerge and remain submerged without additional ballast when the conduits are filled with the products that are being transmitted. Therefore, the weight of the pipeline extending from the main barge is reduced by the flotation of the pipeline, the floatation being controlled by the amount and types of materials fed into the conduits.

FIG. 4 shows a method of selectively raising a portion of the multiconduit pipeline. In the event that the pipeline develops a leak and has to be repaired, the products being transmitted are evacuated by pushing pigs 21 having an entrapped gas pocket 22 therebetween through the conduits 14 by means of compressed gas to the section desired to be raised. The same procedure is followed in the remaining conduits until the reduced ballast causes the line to raise to the surface of the water as shown in FIG. 1 at 18.

It is apparent from the above that by passing the pigs 21 along the entire pipeline, it can be raised along its entire length for inspection and repairs to the anticorrosive coating; in addition, any ocean growth can be controlled.

I claim:

1. A pipeline for underwater material delivery comprising:

a mutliconduit pipeline having an anticorrosive coating, said coated pipeline weighing less per unit of cross-section than water when empty and its buoyancy being controlled by the specific gravity of any materials being transported therethrough;

a pair of spaced apart pigs slidably disposed in one of said conduits, said pigs defining an air-tight chamber between them;

a fluid having a specific gravity of less than water disposed in said chamber; and means for moving said pigs and fluid filled chamber along the length of said conduit whereby the buoyancy of said multiconduit pipeline is selectively increased.

2. A pipeline in accordance with claim 1 wherein said means for moving said pigs comprises a fluid under pressure.

3. A pipeline in accordance with claim 1 wherein said pigs are of a diameter greater than their encompassing conduit.

4. A pipeline for underwater material delivery comprising:

a supply tube;

a plurality of conduits integrally connected to the periphery of said supply tube along its longitudinal axis to form a composite multiconduit pipeline;

an anticorrosive coating surrounding said composite pipeline, said composite coated pipeline weighing less per unit of cross-section than water when empty and its buoyancy being controlled by the specific gravity of any materials being transported therein; and means for selectively controlling the buoyancy of said composite pipeline along its length, said means comprising a pair of spaced apart pigs slidably disposed in one of said conduits, said pigs adapted to travel along the length of said conduit and defining an airtight chamber between them, the buoyancy of the section of conduit encompassing said chamber being controlled by the specific gravity of any fluid disposed in said chamber.

5. A pipeline in accordance with claim 4 wherein said fluid in said chamber defined by said pigs has a specific gravity of less than water.

6. A method of varying the buoyancy of marine multiconduit pipelines comprising the steps of:

inserting a pair of pigs in one of said conduits;

separating said pigs a predetremined distance to form a chamber therebetween;

filling said chamber with a fluid;

moving said pigs along the length of said pipeline to selectively vary the buoyancy of a portion of said pipeline.

7. A method of varying the buoyancy of a multiconduit pipeline in accordance with claim 6 wherein said chamber is filled with a fluid having a specific gravity of less than water.

References Cited

UNITED STATES PATENTS

| 2,000,906 | 5/1935 | Turner | 138—111 X |
| 3,086,369 | 4/1963 | Brown | 138—111 X |
| 3,269,422 | 8/1966 | Matthews et al. | 138—111 |
| 3,311,132 | 3/1967 | McWilliams | 138—111 |

FOREIGN PATENTS

| 563,812 | 9/1958 | Canada. |
| 1,289,421 | 2/1962 | France. |
| 627,031 | 7/1949 | Great Britain. |

SAMUEL ROTHBERG, *Primary Examiner.*

EDWARD J. EARLES, *Assistant Examiner.*

U.S. Cl. X.R.

61—72.3; 138—157